(12) United States Patent
Holzer et al.

(10) Patent No.: US 8,919,711 B2
(45) Date of Patent: Dec. 30, 2014

(54) COUPLING DEVICE HAVING SIDE ADJUSTMENT FOR A DRAWER

(75) Inventors: Andreas Holzer, Dornbirn (AT); Kurt Haemmerle, Lustenau (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 13/564,091

(22) Filed: Aug. 1, 2012

(65) Prior Publication Data
US 2012/0292465 A1 Nov. 22, 2012

Related U.S. Application Data

(63) Continuation of application No. PCT/AT2011/000041, filed on Jan. 26, 2011.

(30) Foreign Application Priority Data

Feb. 3, 2010 (AT) .................................. A 144/2010

(51) Int. Cl.
F16M 11/00 (2006.01)
A47B 88/04 (2006.01)

(52) U.S. Cl.
CPC .................................. A47B 88/0422 (2013.01)
USPC ................. 248/201; 248/221.11; 248/220.21; 312/333; 312/334.4; 312/334.6; 403/231

(58) Field of Classification Search
USPC ............... 248/201, 221.11; 314/334.4, 334.5, 314/333, 334.6, 334.7, 334.8; 403/329, 403/DIG. 14; 312/334.4, 334.5, 333, 334.6, 312/334.7, 334.8
See application file for complete search history.

(56) References Cited

U.S. PATENT DOCUMENTS

| 4,465,324 | A | * | 8/1984 | Rock et al. ....................... 384/19 |
| 5,302,016 | A | * | 4/1994 | Lautenschlager et al. .... 312/333 |
| 5,580,139 | A | * | 12/1996 | Grabher ......................... 312/333 |
| 5,588,729 | A | * | 12/1996 | Berger ........................ 312/334.4 |
| 7,549,712 | B2 | * | 6/2009 | Booker et al. .............. 312/334.6 |
| 7,905,561 | B2 | * | 3/2011 | Ritter ............................. 312/333 |
| 7,922,270 | B2 | * | 4/2011 | Weber ........................... 312/333 |

(Continued)

FOREIGN PATENT DOCUMENTS

| DE | 296 00 180 | 2/1996 |
| DE | 20 2007 006 549 | 7/2007 |

(Continued)

OTHER PUBLICATIONS

International Search Report issued Mar. 29, 2011 in International (PCT) Application No. PCT/AT2011/000041.

(Continued)

Primary Examiner — Monica Millner
(74) Attorney, Agent, or Firm — Wenderoth, Lind & Ponack, L.L.P.

(57) ABSTRACT

The invention relates to a device for detachably coupling a drawer to an extendable rail of a pullout guide, comprising an adjusting apparatus by means of which a position of a drawer connected to the rail can be adjusted in the lateral direction relative to the rail, wherein the device has a fastening part that can be fastened to the drawer and a coupling part that can be coupled to the rail, wherein the coupling part can be detachably coupled to the rail, and wherein the position of the fastening part and the coupling part relative to each other can be adjusted by the adjusting device.

16 Claims, 12 Drawing Sheets

(56) References Cited

U.S. PATENT DOCUMENTS

| | | | |
|---|---|---|---|
| 8,052,234 B2* | 11/2011 | Liang et al. | 312/334.4 |
| 8,056,994 B2* | 11/2011 | Chen et al. | 312/334.6 |
| 8,147,011 B2* | 4/2012 | Chen et al. | 312/333 |
| 8,205,951 B2* | 6/2012 | Boks | 312/319.1 |
| 8,231,189 B2* | 7/2012 | Liang et al. | 312/334.2 |
| 8,336,973 B2* | 12/2012 | Berger | 312/334.4 |
| 8,424,984 B2* | 4/2013 | Ritter | 312/333 |
| 8,727,460 B2* | 5/2014 | Grabher | 312/333 |
| 2001/0019235 A1* | 9/2001 | Hammerle | 312/334.4 |
| 2002/0158557 A1* | 10/2002 | Weichelt | 312/334.4 |
| 2003/0189395 A1* | 10/2003 | Doornbos et al. | 312/334.1 |
| 2004/0227440 A1* | 11/2004 | Booker et al. | 312/334.1 |
| 2004/0239219 A1* | 12/2004 | Kim et al. | 312/334.4 |
| 2007/0046158 A1* | 3/2007 | Hoffman | 312/333 |
| 2008/0218045 A1* | 9/2008 | Moser | 312/333 |
| 2008/0247812 A1* | 10/2008 | Embacher | 403/231 |
| 2009/0033187 A1* | 2/2009 | Chung | 312/319.1 |
| 2009/0236959 A1 | 9/2009 | Liang et al. | |
| 2009/0261700 A1* | 10/2009 | Chen et al. | 312/334.46 |
| 2012/0038255 A1* | 2/2012 | Netzer et al. | 312/319.1 |
| 2012/0049712 A1* | 3/2012 | Lobbezoo | 312/334.12 |

FOREIGN PATENT DOCUMENTS

| | | |
|---|---|---|
| DE | 20 2007 014 954 | 12/2008 |
| DE | 20 2007 017 999 | 4/2009 |
| DE | 20 2009 003 886 | 6/2009 |
| EP | 0 421 458 | 4/1991 |
| EP | 0 701 787 | 3/1996 |
| EP | 1 147 725 | 10/2001 |
| EP | 1 457 137 | 9/2004 |
| JP | 6-169822 | 6/1994 |
| WO | 2009/056326 | 5/2009 |
| WO | 2009/080403 | 7/2009 |
| WO | 2009/149479 | 12/2009 |

OTHER PUBLICATIONS

Austrian Patent Office Search Report completed Oct. 5, 2010 in Austrian Patent Application No. A 144/2010.

* cited by examiner

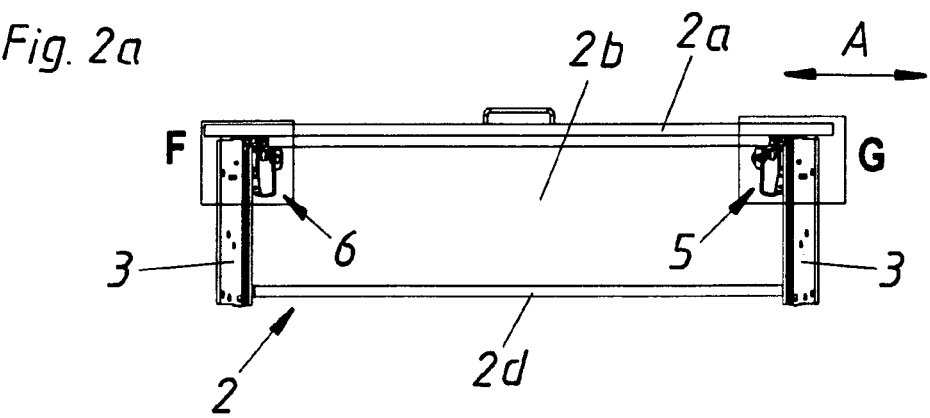
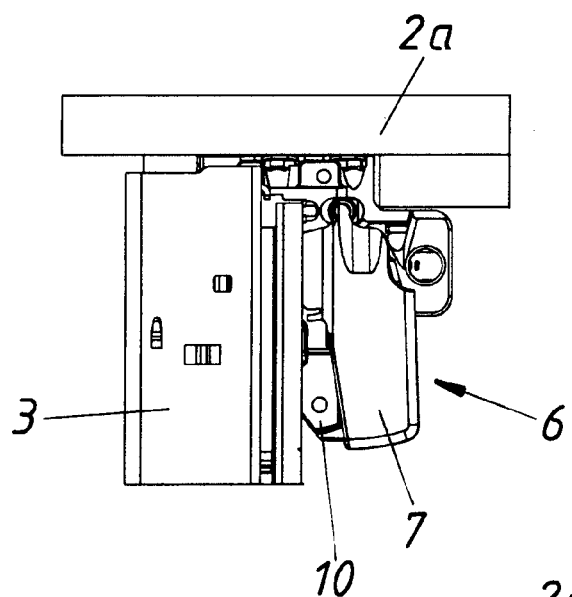
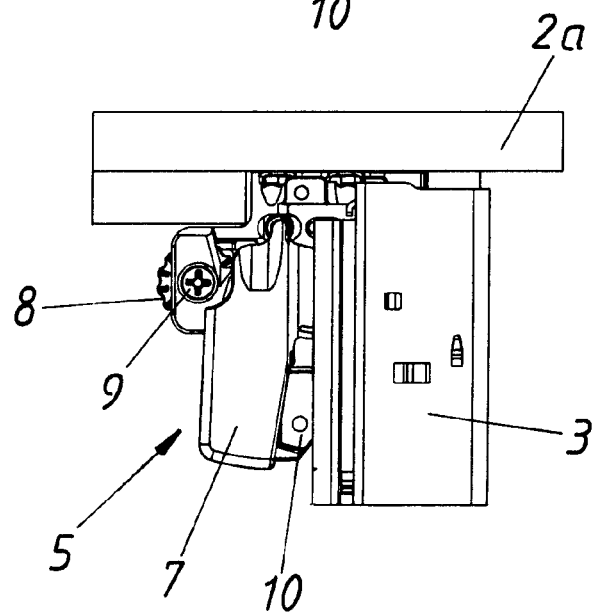

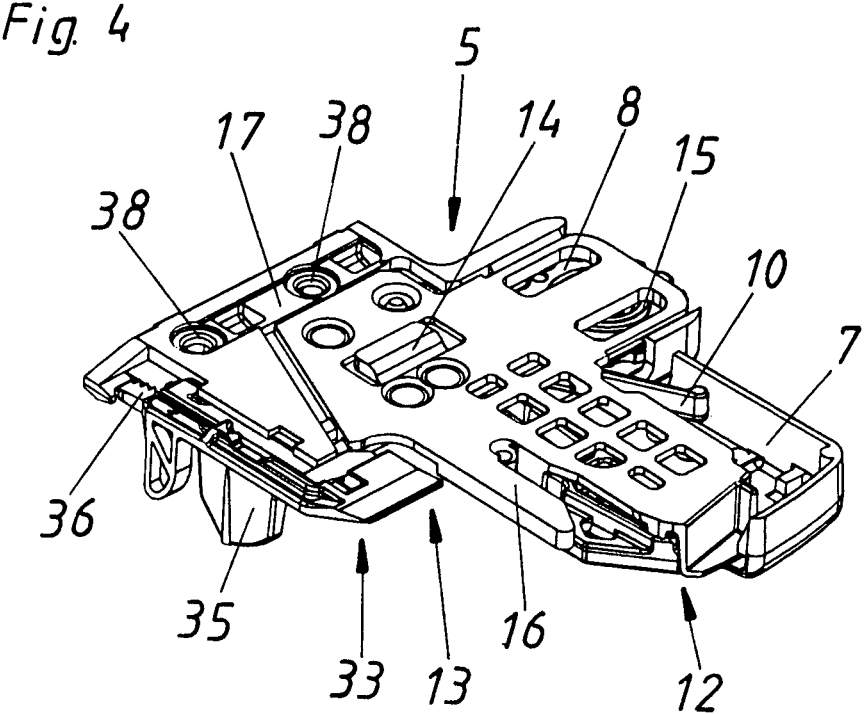

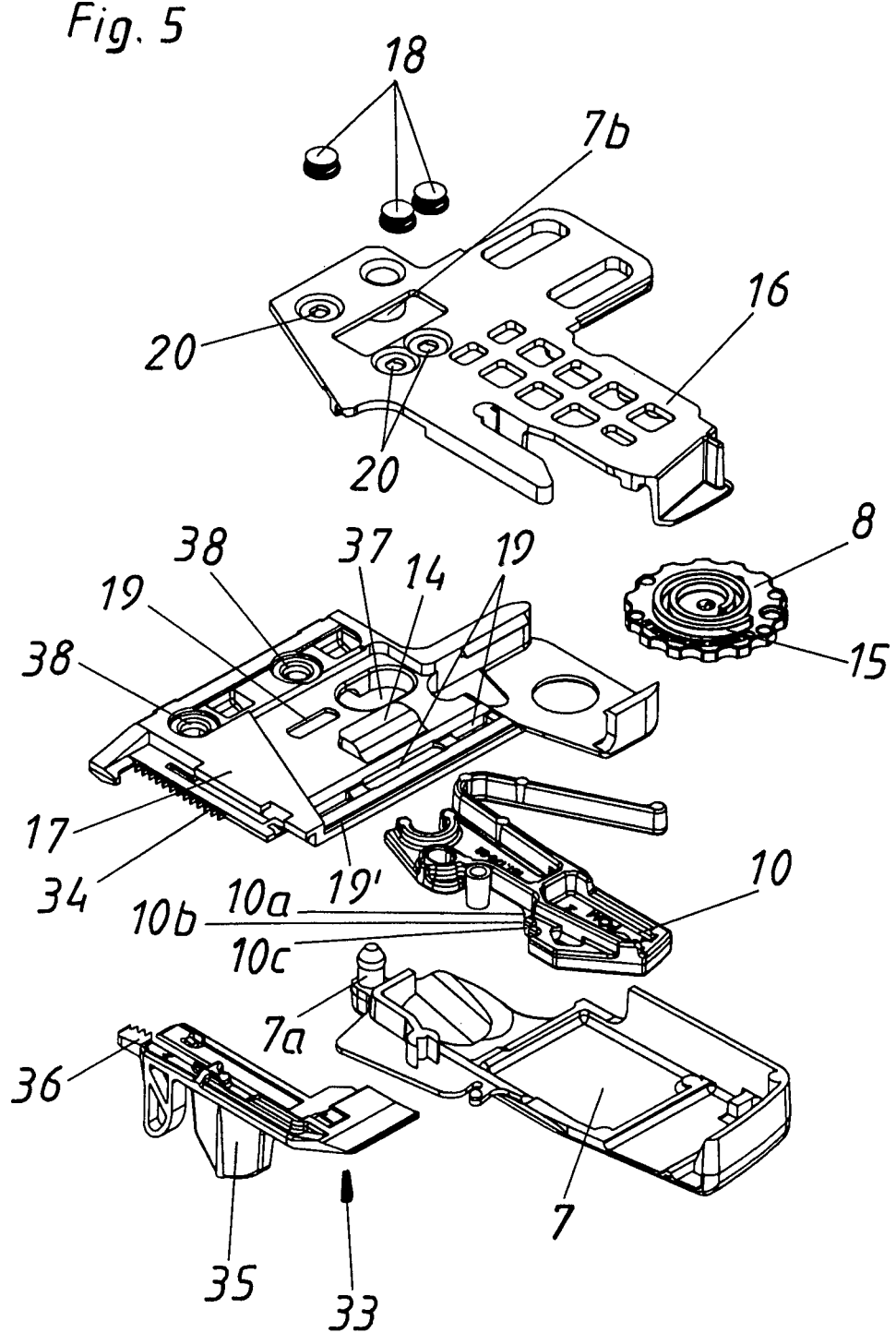

COUPLING DEVICE HAVING SIDE ADJUSTMENT FOR A DRAWER

This application is a Continuation of International Application No. PCT/AT2011/000041, filed Jan. 26, 2011, the entire disclosure of which is incorporated herein by reference.

The invention concerns an apparatus for releasably coupling a drawer to an extendable rail of an extension guide, comprising an adjusting device by which a position of a drawer connected to the rail can be adjusted in the lateral direction relative to the rail, wherein the apparatus has a fixing portion which can be fixed to the drawer and a coupling portion which can be coupled to the rail, wherein the coupling portion can be releasably coupled to the rail.

Coupling apparatuses with which a drawer can be easily fitted to or removed from a rail of an extension guide are known in the state of the art. In most cases the coupling apparatus is fixed to the drawer while the extension guide is mounted to the article of furniture. The drawer which is pushed on to the extension guide can be connected to a rail of the extension guide by means of the coupling apparatus, wherein for making that connection arranged in the connecting region are abutment surfaces, by means of which automatic latching of the drawer to the rail of the extension guide can take place. Examples of such fixing options are shown in EP 0 421 458 B1, DE 20 2007 006 549 U1 and WO 2009/149479 to the present applicant.

Due to minor inaccuracies in the production of the extension guide or the apparatus for releasably coupling the drawer to the extension guide or due to inaccuracies upon mounting thereof in or to a furniture carcass or the drawer it can happen that a drawer which can be pulled out of a furniture carcass by means of such an extension guide cannot be pulled out in the longitudinal direction as desired but slightly inclinedly relative thereto. The drawer is therefore set in a slightly inclined position. Particularly if a plurality of drawers are arranged in a furniture carcass that means that the front panels of the drawers are not arranged homogeneously. Such an untidy front appearance on a furniture carcass is undesirable. To adjust the installed drawers in the vertical direction, a coupling apparatus for a drawer is known in the state of the art, the coupling apparatus being in engagement with a holding element which is mounted to the drawer and which has a grooving, wherein heightwise adjustment, that is to say adjustment in a vertical direction, is possible by latching on the groovings. In addition EP 1 147 725 B1 shows a possible way with which the inclination of the front panel of a drawer which has already been fitted in place can be adjusted relative to the carcass without a substantial change in the heightwise position. EP 1 457 137 shows a possible way of heightwise adjustment by a wedge which is pushed in between the rail and the drawer or the apparatus for releasable coupling.

DE 296 00 180 U1 shows such an apparatus for releasably coupling with a lateral and heightwise adjusting device. A spring-loaded bolt engages into an opening in an adaptor rail fixedly connected to the extension rail, wherein the bolt is movable by an actuating knob against the spring force to release the coupling. Provided for lateral adjustment is an adjusting spindle which engages into the adaptor rail by way of an abutment element and can thereby displace the apparatus relative to the adaptor rail. In that respect there is the danger of inadvertently releasing the coupled condition of the apparatus to the extension rail. Furthermore an additional component is necessary, with the adaptor rail, and that leads to further disadvantages in terms of manufacturing complication and expenditure and also the space required for the apparatus.

Besides those adjusting options in a vertical direction, it is known in the state of the art for a coupling apparatus of the kind set forth in the opening part of this specification to be provided with lateral adjustment. For that purpose there is provided a slider having an abutment surface, the slider being adjustably movably mounted in the coupling apparatus. The abutment surface of the slider bears against a corresponding abutment surface of the extension guide so that the drawer can also be moved in a lateral direction relative to the extension guide by an adjustment of the position of the slider in a lateral direction. In that respect there is the danger that the coupling apparatus comes loose from the engagement position with the extension rail, especially as the coupling apparatus produces a lever action, due to the slider movably mounted in the apparatus.

DE 296 00 180 U1 shows an apparatus for releasably coupling with a lateral and heightwise adjusting device for orientation of a drawer with respect to a furniture carcass. A spring-loaded bolt engages into an opening in an adaptor rail fixedly connected to the extension rail, wherein the bolt is movable by an actuating knob against the spring force to release the coupling. Provided for lateral adjustment is an adjusting spindle which engages into the adaptor rail by way of an abutment element and can thereby displace the apparatus relative to the adaptor rail. In that respect there is the danger of inadvertently releasing the coupled condition of the apparatus to the extension rail. Furthermore an additional component is necessary, with the adaptor rail, and that leads to further disadvantages in terms of manufacturing complication and expenditure and also the space required for the apparatus.

The object of the invention is to provide an apparatus with which a drawer which is fitted in a furniture carcass and which is connected to an extension guide can be adjusted in the lateral direction and in that case avoids the disadvantages of the state of the art, while the aim is to avoid inadvertent release of the apparatus from the rail.

That is made possible by an apparatus having the features of according to a first aspect of the invention.

The apparatus according to the invention for releasably coupling a drawer to an extendable rail of an extension guide permits fitment and removal of the drawer in its entirety to or from the extension guide in the simple manner referred to in the opening part of this specification.

To alter the position of a drawer connected to the rail relative to the rail in a lateral direction, for example to correct the configuration of the joins of a drawer fitted in a furniture carcass, it is now provided according to the invention that the releasable coupling apparatus has a fixing portion which can be fixed to the drawer and a coupling portion which can be coupled to the rail, wherein the coupling portion and the fixing portion are movable relative to each other and in that respect the relative position of the fixing portion and the coupling portion is adjustable relative to each other by way of an adjusting device provided in the releasable coupling apparatus.

In the mounted condition in which the drawer is connected to the rail of an extension guide the coupling portion of the apparatus provides for connecting the drawer to the rail by the fixing portion of the apparatus being fixed to the drawer and the coupling portion being releasably connected to the rail.

The adjustability according to the invention of the relative positions of the fixing portion and the coupling portion with respect to each other provides that the position of the drawer connected to the rail is adjustable relative to the rail in a lateral direction, wherein the lateral direction in the mounted condition relates to a horizontal direction transversely relative to the longitudinal direction, in which the drawer can be pulled out.

In that respect it can be provided that the fixing portion and the coupling portion are guided displaceably on each other, for example by abutment surfaces of a suitable configuration, so as to ensure that the positional displacement actually occurs in the lateral direction.

It can further be provided that the fixing portion and the coupling portion each include a mounting plate, wherein the mounting plate of the fixing portion has fixing devices, for example drilled holes for screws, by means of which the fixing portion can be fixed to the drawer. The coupling element which in the mounted condition is in engagement with the rail of the extension guide is mounted to the mounting plate of the coupling portion. For relative positional adjustment of the fixing portion and the coupling portion with respect to each other it can be provided in that case that the adjusting device displaces the positions of the mounting plate of the fixing portion and the mounting plate of the coupling portion relative to each other in the lateral direction.

In that case the adjusting device can be of a self-locking nature so that after active adjustment of the drawer relative to the extension rail in the lateral direction further independent displacement is prevented. That self-locking action can be based for example on frictional engagement of the components of the adjusting device.

The extension guide can have a carcass rail and a drawer rail, the carcass rail being mounted to a furniture carcass and the drawer rail being extendable along the carcass rail. For mounting the drawer in the furniture carcass the drawer is releasably coupled to the drawer rail by way of the apparatus according to the invention.

It can further be provided that disposed between the carcass rail and the drawer is a central rail which permits full extension of the drawer.

Further advantages of the present invention are defined in the appendant claims.

In an advantageous embodiment of the invention arranged on the apparatus is a guide device by which the fixing portion and the coupling portion are guided displaceably relative to each other to guarantee the desired adjustability in the lateral direction. In that case the guide device is at least of a two-part configuration, wherein a part of the guide device, that is arranged on the fixing portion, is operatively connected to an associated part of the guide device, that is arranged on the coupling portion. If the fixing portion and the coupling portion each have a mounting plate the guide device can be part of the two mounting plates.

It is particularly preferably provided in that respect that the guide device has at least one slot which is arranged in the fixing portion or in the coupling portion and into which engages a guide pin or guide projection fitted on the other of said two portions. In that case the guide pin or guide projection is displaceable in the slot. If there are a plurality of such slots with associated guide projections or guide pins an alternate arrangement may be desirable, wherein one slot is arranged on the fixing portion and a further slot is arranged in the coupling portion, into which slots respectively engage guide pins or guide projections mounted on different portions. That permits particularly stable guidance for the movement. If the fixing portion and the coupling portion have mounting plates it can again be provided that the slot and the guide pin or projection are arranged thereon. Instead of a slot a sliding guide arrangement is also conceivable.

In a preferred embodiment the adjusting device with which the positions of the fixing portion and the coupling portion are adjustable relative to each other is at least of a two-part configuration, wherein a first part is arranged on the fixing portion which comes into operative relationship with a second part arranged on the coupling portion.

In that case the adjusting device may be such that it permits stepless adjustment of the relative positions with respect to each other or a discrete positional displacement.

With an arresting device which can also be provided, the relative positions of the fixing portion and the coupling portion with respect to each other can be arrested. That arresting action can be released. Such an arresting device provides that inadvertent displacement of the set positions of the fixing portion and the coupling portion relative to each other is no longer possible, thereby preventing further lateral displacement of the drawer relative to the extension guide. Preferably in that case the arresting device includes an eccentric screw producing a clamping action. Other means such as for example a screw or the like can naturally also be used for arresting the fixing portion with the coupling portion.

In an embodiment of the invention the adjusting device has an adjusting wheel with a spiral disk, which is mounted rotatably to the fixing portion or the coupling portion. The spiral disk includes abutment surfaces of a spiral configuration which are in engagement with holding elements mounted at discrete spacings. If the adjusting wheel is arranged on the fixing portion the holding elements are arranged on the coupling portion and vice-versa. The holding elements can be for example in the form of a tooth arrangement similarly to a toothed rack. Rotation of the adjusting wheel causes the spiral disk for positional displacement of the fixing portion and the coupling portion to be guided along the holding elements. In that respect the adjusting wheel can be actuable without the use of a tool and allows adjustment in both directions. Additionally or alternatively there can be a screw with which the adjusting wheel is actuable by means of a screwdriver.

In a further embodiment the adjusting device includes a gear which is arranged in the fixing portion or in the coupling portion and which is in engagement with a tooth arrangement on the other of said two portions. If therefore the gear is arranged on the fixing portion the tooth arrangement with which the gear is in engagement is arranged on the coupling portion and vice-versa. In that case the tooth arrangement is arranged in a lateral direction in the mounted condition so that rotation of the gear can produce a lateral movement.

The adjusting device can also include an eccentric which also produces the positional displacement of the fixing portion and the coupling portion, by a rotary movement. Naturally further adjusting devices, for example with a lever or a pushrod, can also be used in accordance with the invention.

The invention further concerns an apparatus set for releasably coupling a drawer to two extendable rails of a respective extension guide, the rails being arranged at mutually opposite sides of a furniture carcass. In that case the apparatus set includes a first apparatus for releasably coupling the drawer to the first rail, wherein the first apparatus is of the configuration as set forth hereinbefore. A second apparatus for releasably coupling the drawer to the second rail serves to couple the drawer on the two sides thereof to the corresponding extendable rails of an extension guide. In that case the extension guides to be arranged on both sides of the drawer can each include a respective carcass and a drawer rail. A central rail can be arranged between the carcass and the drawer rails. The two apparatuses are correspondingly mounted on the two sides of the drawer, in which respect it is preferably provided that the apparatuses are arranged in the front region, that is to say in the region of the front panel.

According to the invention it is now provided that only the first apparatus has an adjusting device for relative positional displacement of the fixing portion and the coupling portion. So that the drawer is nonetheless displaceable relative to the rail in a lateral direction the second apparatus for releasable coupling is also of a partially movable configuration in corresponding fashion. The second apparatus according to the invention has a second fixing portion which can be fixed to the drawer and a second coupling portion which can be coupled to the rail, wherein the second fixing portion and the second coupling portion are mounted movably relative to each other for adaptation to the relative positional displacement of the fixing portion and the coupling portion of the first apparatus.

The second coupling portion and the second fixing portion are mounted floatingly relative to each other. If the relative position of the fixing portion and the coupling portion of the first apparatus is adjusted by means of the adjusting device, that leads to a joint movement of the second fixing portion or the second coupling portion so that the relative position thereof is also displaced.

In that respect the second apparatus can be of substantially the same structure as the first apparatus, except for the adjusting device which is not present in contrast to the first apparatus.

It is preferably provided that arranged at the second apparatus is a second guide device by which the second fixing portion and the second coupling portion are guided displaceably relative to each other. In that case the second guide device can have at least one slot which is arranged in the second fixing portion or in the second coupling portion and in which a guide pin or guide projection mounted to the other of said two portions engages in a similar manner to the above-described guide device and is mounted movably there.

In a preferred embodiment it is provided that the second apparatus has an arresting device by which the second fixing portion and the second coupling portion can be releasably arrested so that further relative movement of those portions is prevented. If it is provided that only one such arresting device is arranged only on the second apparatus, lateral positional displacement of the drawer relative to the rails is possible only when the arresting device at the second apparatus is released and then the adjusting device at the first apparatus is actuated. Thus inadvertent adjustment is impossible. The fixing portion and the coupling portion of the first apparatus cannot move relative to each other by the second apparatus being arrested.

The invention further concerns a drawer having at least one extension guide and an apparatus as described hereinbefore fixed to the drawer or an apparatus set as described hereinbefore fixed to the drawer.

The invention further concerns an article of furniture comprising at least one such drawer.

BRIEF DESCRIPTION OF THE DRAWINGS

Further details and advantages of the present invention are described by means of the specific description hereinafter. In the drawing:

FIGS. 2a-2c show a view from below of a drawer coupled to extension guides by means of an apparatus set according to the invention and two associated detail views, FIG. 4 shows a perspective view of an apparatus according to the invention, FIG. 5 shows an exploded view of an apparatus according to the invention.

DETAILED DESCRIPTION OF THE INVENTION

Figure 1:
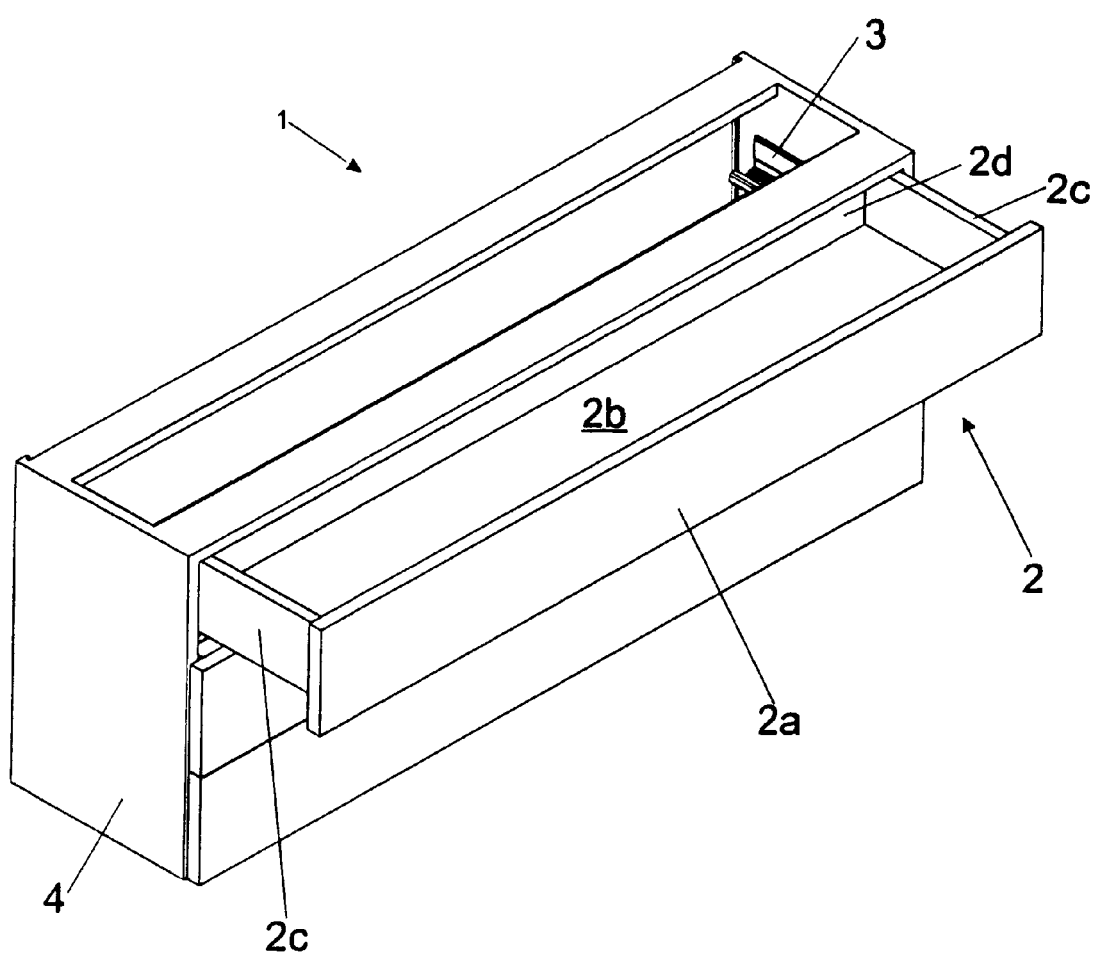
FIG. 1 shows a partly broken-away perspective view of an article of furniture according to the invention.

The partly broken-away perspective view in FIG. 1 shows an article of furniture 1 with a plurality of extendable drawers 2 which are arranged in a furniture carcass 4 and which are mounted in the furniture carcass 4 by way of two respective extension guides arranged at mutually opposite sides of the furniture carcass 4. The extension guides 3 are arranged on mutually opposite side walls 2c of the drawer 2. At its front side the drawer 2 has a front panel 2a while at its rear side it has a drawer rear wall 2d. A drawer bottom 2b is arranged therebetween.

FIG. 2a shows a drawer 2 coupled at the mutually opposite side walls 2c to a respective extension guide 3. In that case the extension guides 3 include a carcass rail 3c fixed to the furniture carcass 4. The furniture carcass 4 is not shown in this Figure for the sake of clarity. In this case the drawer 2 is coupled with an apparatus set according to the invention to the two extension guides 3 fixed at opposite sides of the furniture carcass 4. Arranged at the front end of the drawer bottom 2b, that is in the region of the front panel 2a, are two apparatuses 5, 6 for releasable coupling to the rails 3a of an extension guide 3. In this case a first apparatus 5 has an adjusting device which by way of an adjusting wheel 8 permits a lateral displacement in the direction of the double-headed arrow A of the drawer 2 relative to the extension guide 3. Arranged on the opposite side is a second apparatus 6 which does not have an adjusting device. The second apparatus 6 however is so designed that it permits lateral positional displacements of the drawer 2.

FIG. 2b shows a detail view of the portion marked F in FIG. 2a. The second apparatus 6 serves like the first apparatus 5 for releasably coupling the drawer 2 to an extension guide 3. A resilient or spring-loadable latching portion 10 is automatically latchable to a rail 3a of an extension guide 3 in the course of the mounting process. To release the arresting action there is a release portion 7 in the form of a pivotal lever which is to be operated by hand so that the coupling between the second apparatus 6 and the rail 3a of the extension guide 3 is releasable.

FIG. 2c shows a detail view of the portion marked G in FIG. 2a. For releasably coupling the drawer 2 to the rail 3a of an extension guide 3, this arrangement has a first apparatus 5 according to the invention which has a latching portion 10 of the same design for latching purposes and a release portion 7 of the same design for releasing the coupling, as the second apparatus 6. In contrast to the second apparatus 6 the apparatus 5 has an adjusting device with an adjusting wheel 8 which can be operated without a tool and with which the drawer is displaceable laterally in the direction of the double-headed arrow A relative to the extension guide 3. The adjusting wheel 8 can also be operated with a tool, by means of a screw 9.

Figure 3A:
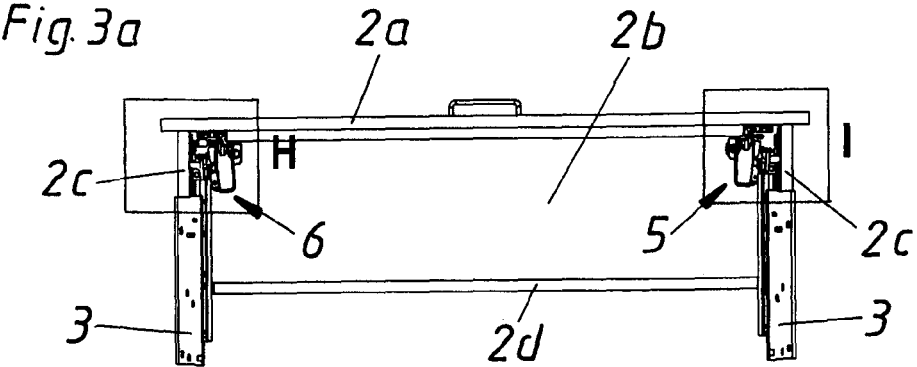
FIGS. 3a-3c show a view from below of a drawer coupled to two extension guides by means of an apparatus set according to the invention in the partly pulled-out condition.

FIG. 3a shows the same arrangement as FIG. 2a, the drawer 2 being in a partially pulled-out condition. The furniture carcass 4 is once again not shown.

Figure 3B:
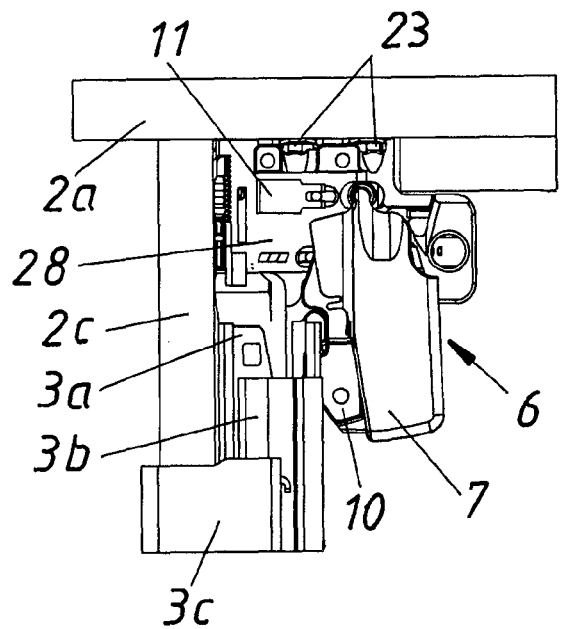

FIG. 3b shows a detail view of the portion marked H in FIG. 3a. It can be seen that the extension guide 3 includes a drawer rail 3a to which the drawer 2a is releasably coupled, a carcass rail 3c mounted in the furniture carcass 4 and a central rail 3b arranged between the drawer rail 3a and the carcass rail 3c. The latching portion 10 of the second apparatus 6 engages into openings in the drawer rail 3a for latchingly coupling to the drawer 2. An arresting device 11 serves for arresting the position of the drawer in a lateral direction and is described in greater detail hereinafter.

Figure 3C:
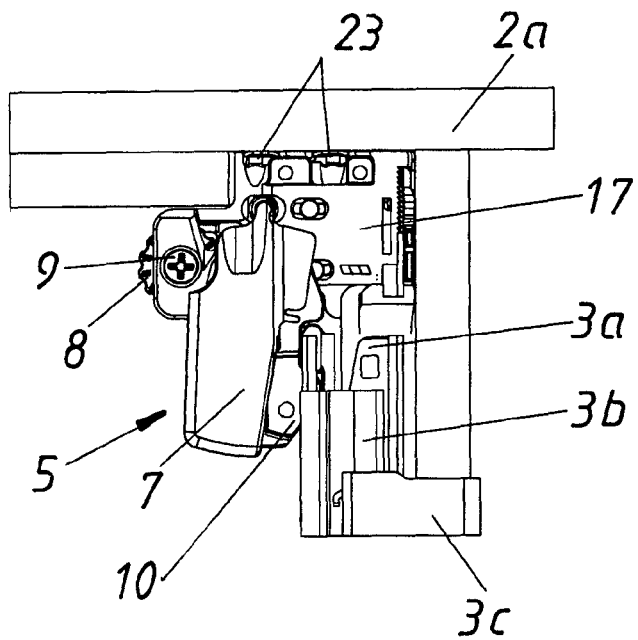

FIG. 3c shows a detail view of the portion marked H in FIG. 3a. In this case too it is possible to see the drawer rail 3a, the central rail 3b and the carcass rail 3c of an extension guide 3, the first apparatus 5 for releasably coupling the drawer 2 to the drawer rail 3a being of a similar design to the second apparatus 6. The first apparatus 5 however includes an adjusting device for displacement of the drawer 2 relative to the extension guide 3 in a lateral direction. FIGS. 3b and 3c show drilled holes 23 with which the apparatus 5 and the second apparatus 6 are fixed to the front panel 2a.

FIG. 4 shows a perspective view of the apparatus 5, the side of the apparatus 5 shown here bearing against the drawer bottom 2b. In this case the apparatus 5 includes a fixing portion 13 with which the apparatus can be fixed to the drawer. That purpose is served by drilled holes 38 with which the fixing portion 13 can be fixed to the drawer bottom 2b and drilled holes 23 with which the fixing portion 13 can be fixed to the front panel 2a. The holes 23 are arranged at the side of the apparatus 5, that is not shown, and cannot be seen in this Figure. The apparatus 5 further includes a coupling portion 12, wherein the positions of the coupling portion 12 and the fixing portion 13 are displaceable relative to each other. In that displacement the gap 15 between the coupling portion 12 and the fixing portion 13 becomes smaller or larger. In this case the fixing portion 13 has a mounting plate 17 against which a mounting plate 16 of the coupling portion 12 partially bears. In this arrangement the mounting plate 17 of the coupling portion 12 is mounted displaceably. A holding portion 14 of the fixing portion 13 projects through a corresponding opening in the form of a slot in the coupling portion 12. That holding portion 14 serves on the one hand for guiding the relative positional displacement of the coupling portion 12 and the fixing portion 13, the displaceability being limited by the limits of the slot. The holding portion 14 also serves for supporting the apparatus 5 on the drawer bottom 2b.

The latching portion 10 and the release portion 7 are mounted pivotably to the coupling portion 12. The adjusting wheel 8 with the spiral disk 15 is mounted rotatably to the fixing portion 13. An adjusting element 35 is arranged on the fixing portion 13 of the apparatus 5 and serves for heightwise adjustment of the drawer 2, that is to say adjustment of the drawer 2 in a vertical direction. Arranged on the fixing portion 13 is a tooth arrangement 34 which in the mounted condition is oriented in the longitudinal direction of the extension guide 3. The adjusting element 35 has a tooth arrangement 36 having teeth corresponding to the tooth arrangement 34. By virtue of displacement of the adjusting element 35 in the longitudinal direction of the extension guide 3 a wedge surface 33 is pushed between the extension guide 3 and the drawer bottom 2b and thereby lifts the drawer 2 in a vertical direction. A corresponding adjustment element 35 with wedge surface 33 and tooth arrangement 36 is arranged on a tooth arrangement 34 of the second fixing portion 27 in corresponding fashion so that the drawer 2 is vertically adjustable on both side walls 2c.

FIG. 5 shows an exploded view of the apparatus 5. The mounting plate 16 of the coupling portion 12 is guided displaceably on the mounting plate 17 of the fixing portion 13 in the assembled condition of the apparatus 5. Guide pins 18 serve to connect the two mounting plates 16, 17 and thus the fixing portion 13 and the coupling portion 12. Arranged in the mounting plate 17 of the fixing portion 13 are slots 19 in which the guide pins 18 are displaceably guided. Because the guide pins 18 arranged in the slots 19 are non-displaceably mounted in through holes 20 in the mounting plate 16 of the coupling portion 12 the coupling portion 12 is guided displaceably by the fixing portion 13 by means of the slots 12. A further guide pin 24 engages into a slot 19', the guide pin 24 being formed on the side of the mounting plate 16, that is towards the fixing portion 13, and not being visible in this view.

The adjusting wheel 8 with the spiral disk 15 is mounted rotatably on the fixing portion 13. The latching portion 10 and the release portion 7 are mounted pivotably to the mounting plate 16 of the coupling portion 12. For that purpose a stub shaft 7a engages into a corresponding receiving means 7b on the mounting plate 16 of the coupling portion 12. To permit that, a through hole 37 is provided in the mounting plate 17 of the fixing portion. In that arrangement the latching portion is resilient or can be loaded by a spring and is latchable into an opening in the drawer rail 3a of an extension guide 3. In this case the latching portion 10 has at least one and preferably a plurality of abutment surfaces which can be brought to bear against an edge of the opening in the drawer rail 3a. The abutment surfaces 10a, 10b, 10c are arranged in mutually displaced relationship in the extension direction of the drawer 2, thereby permitting sequential latching engagement of the latching portion 10 on the drawer rail 3a. The coupled condition of the latching portion 10 is releasable by means of the release portion 7. Heightwise adjustment of the drawer by means of the adjusting element 35 and the tooth arrangements 34 and 36 as well as the wedge surface 33 is implemented as described above.

Figure 6A:
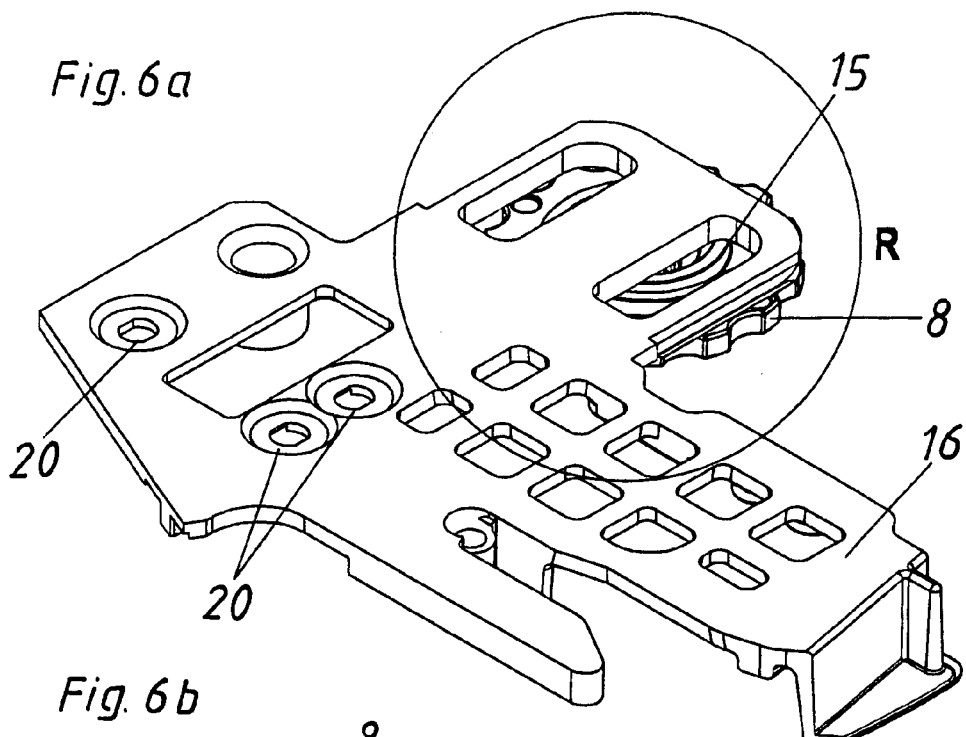
FIGS. 6a-6c show a perspective view of the coupling portion with an adjusting wheel mounted rotatably to the fixing portion, a detail view of the adjusting device and a sectional view along the section line identified by T-T in FIG. 6b, FIGS. 7a and 7b show a plan view and a view from below of an apparatus according to the invention.

The perspective view of FIG. 6a shows the mounting plate 16 of the coupling portion 12 as well as the adjusting wheel 8 which is mounted rotatably to the fixing portion 13 and has a spiral disk 15.

Figure 6B:
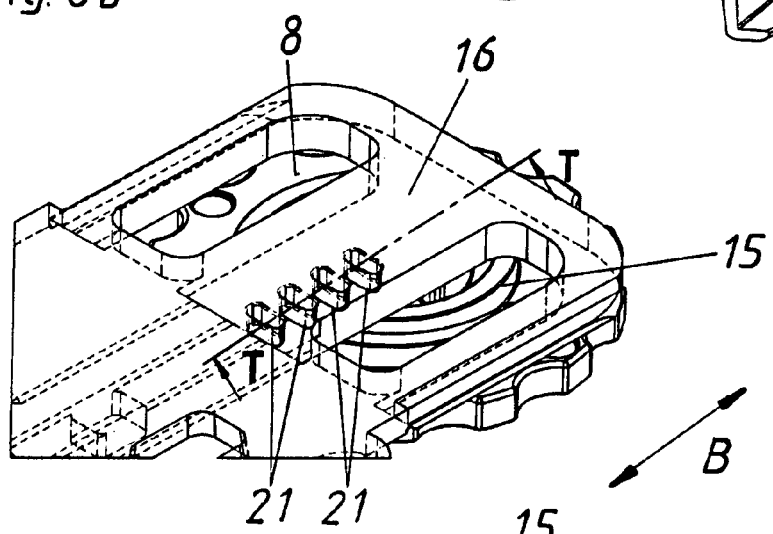
Figure 6C:
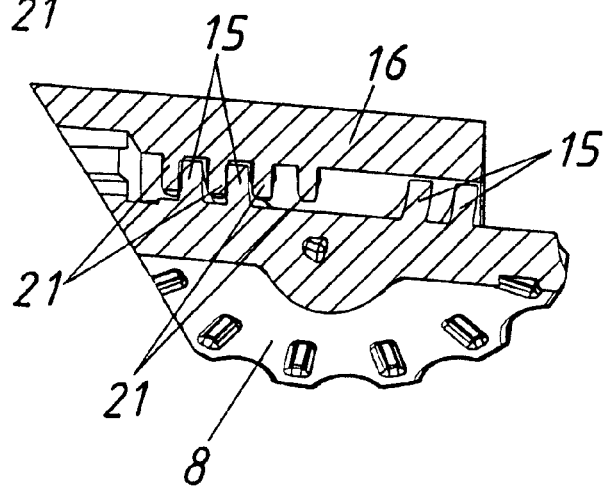

FIG. 6b shows a detail view of the portion marked R in FIG. 6a, wherein holding elements 21 are arranged at discrete spacings on the side of the mounting plate 16, that is not shown, and for that reason are shown in broken line or by faded-out lines. The holding elements 21 arranged in the form of a tooth arrangement are operatively connected to the spiral disk 15. That can be seen in the sectional view in FIG. 6c showing a section along the section line marked TT in FIG. 6b. The tooth-shaped holding elements 21 and the abutment surfaces of the spiral disk 15 are in engagement. The abutment surfaces of the spiral disk 15 are guided along the holding elements 21 by rotation of the adjusting wheel 8, thereby providing for relative positional displacement of the fixing portion 13 and the coupling portion 12 in the direction of the double-headed arrow marked with B.

Figure 7A:
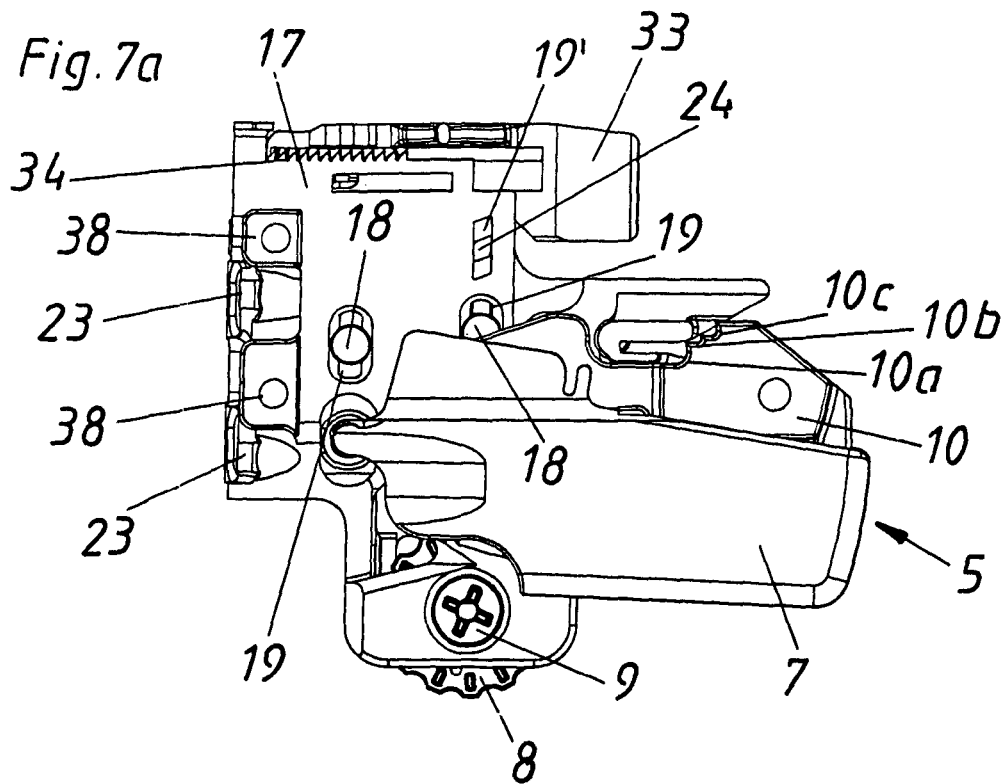

FIG. 7a shows a plan view of the apparatus 5 of FIG. 4. Arranged on the mounting plate 17 of the fixing portion 13 are drilled holes 23 with which the fixing portion 13 can be fixed to the drawer 2. In addition the adjusting wheel 8 which can also be actuated by a screw 9 is mounted to the fixing portion 13. The adjusting wheel 8 is part of the adjusting device, together with the spiral disk 15 and the holding elements 21 arranged on the coupling portion 12. In addition, a release portion 7 and a latching portion 10 with abutment surfaces 10a, 10b, 10c are mounted pivotably to the coupling portion 12 for latching engagement with a rail of an extension guide 3. The guide pins 18 are guided displaceably in slots 19 in the mounting plate 17. Those slots 19 are part of the guide device which ensures relative mobility of the fixing portion 13 and the coupling portion 12 relative to each other. A guide pin 24 is arranged in a further slot 19', also for movement guidance. The guide pins 18 and 24 also serve for fixing the fixing portion 18 and the coupling portion 19 together.

Figure 7B:
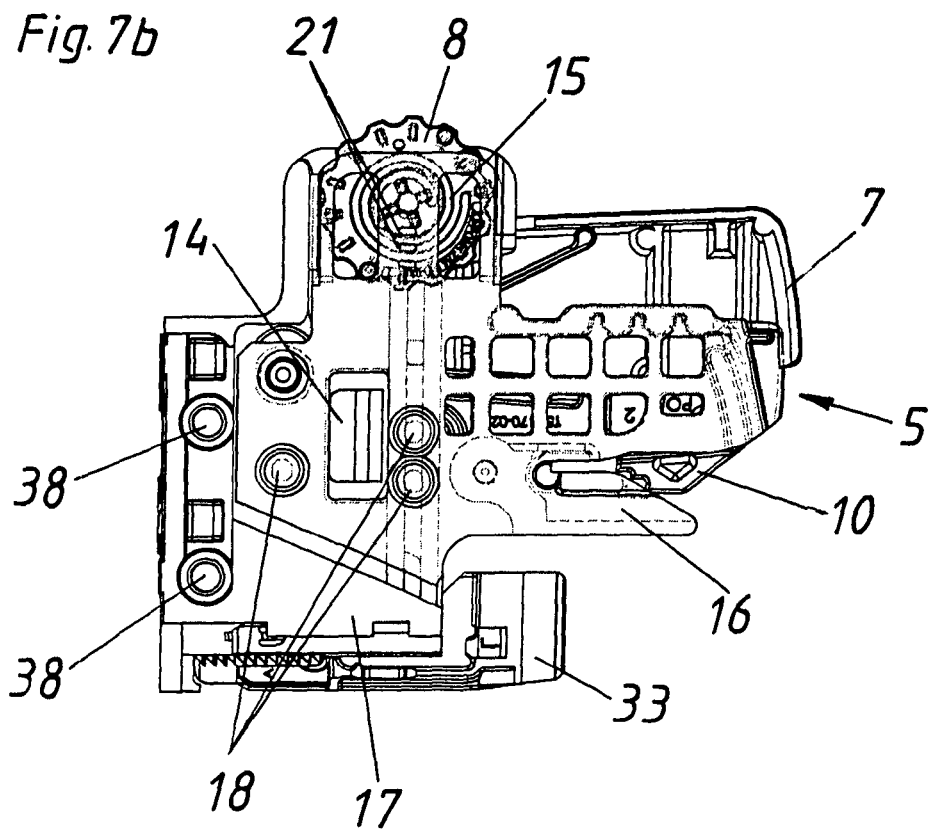

FIG. 7b shows a view from below of the apparatus 5 in FIG. 7a, wherein parts which per se cannot be seen are illustrated in partially transparent fashion, like for example the holding elements 21 which are in engagement with the spiral disk 15.

Figure 8:
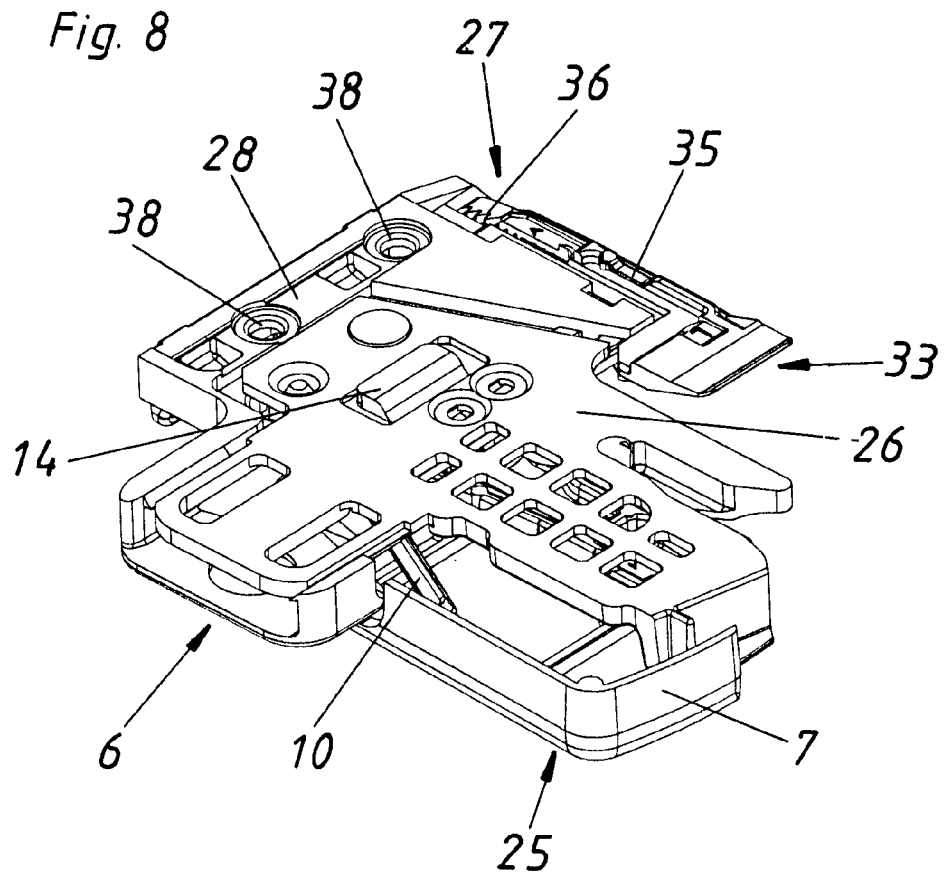
FIG. 8 shows a perspective view of the second apparatus according to the invention.

FIG. 8 shows a perspective view of a second apparatus 6. It is of substantially the same structure as the apparatus 5. It does not include however the adjusting device with adjusting wheel 8 and holding elements 21. The second apparatus 6 has a second coupling portion 25 including a mounting plate 26 which is guided displaceably on a mounting plate 28 of a second fixing portion 27 in the same way as the mounting plates 16, 17 of the first apparatus 5. In that respect the second fixing portion 27 and the second coupling portion 25 are mounted floatingly so that they can follow active adjustment of the relative positions of the fixing portion 13 and the coupling portion 12 of the apparatus 5. Drilled holes 23 serve for fixing the second fixing portion 27 to the front panel 2a. Further drilled holes 38 serve for fixing the second fixing portion 27 to the drawer bottom 2b.

Figure 9:
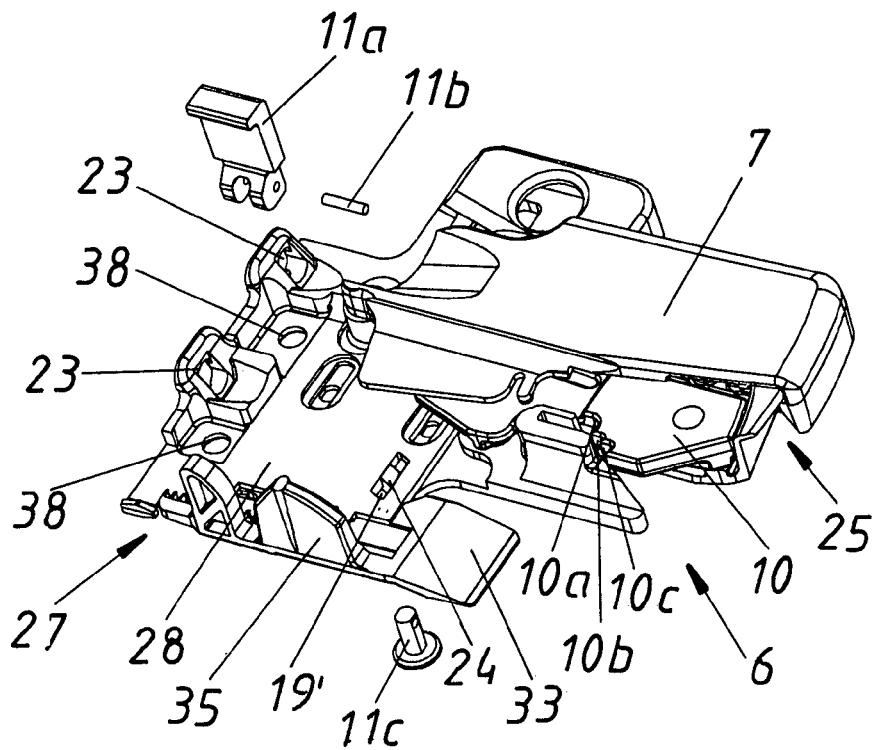
FIG. 9 shows a perspective view of the second apparatus according to the invention with an exploded view of the arresting device.

FIG. 9 shows a perspective view illustrating that the side of the second apparatus 6, that is not shown in FIG. 8, at least as regards the pivotable mounting of a release portion 7 and a latching portion 10 as well as the guide device thereof, corresponds to the structure of the apparatus 5. In addition the second apparatus 6 however has an arresting device 11 including a lever 11a assembled by way of a pin 11b with a clamping screw 11c in such a way that arresting of the second fixing portion 27 and the second coupling portion 25 prevents further relative positional displacement of those portions. The second apparatus 6 does not include an adjusting device which would allow active positional displacement of the second fixing portion 27 and the second coupling portion 25 respectively.

Figure 10:
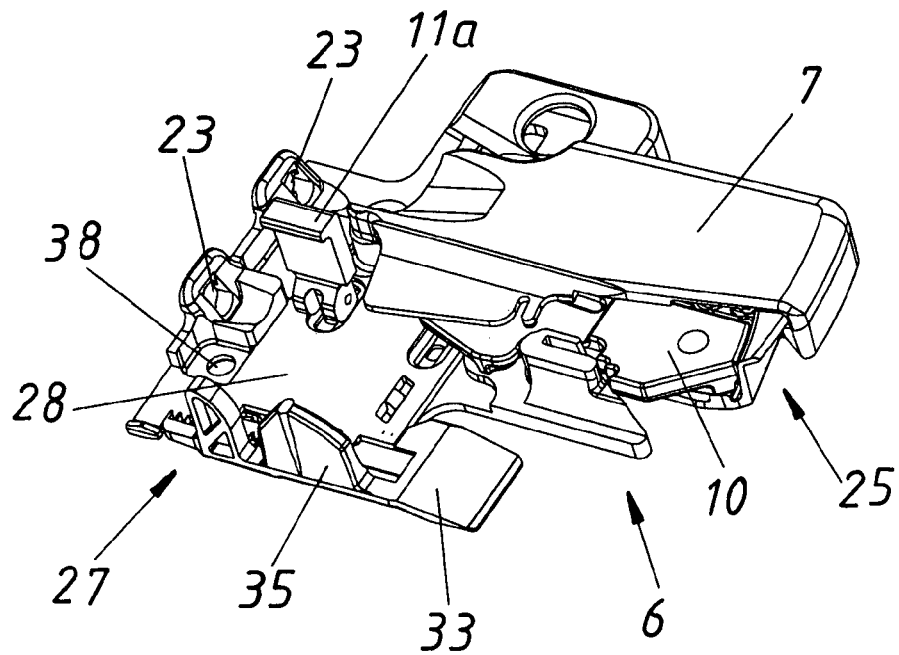
FIG. 10 shows a perspective view of the second apparatus with the arresting device in the open position.

FIG. 10 is a perspective view showing the elements of FIG. 9 in the assembled condition. The lever 11a of the arresting device 11 is in the open position. When it is pivoted in the direction of the mounting plate 28 of the second fixing portion, the pin 11b serving as an axis of rotation, that affords a clamping action. In that respect that clamping action is preferably so great that rotation of the adjusting wheel 8 on the apparatus 5 and thus positional displacement of the drawer 2 in total in the lateral direction is also prevented.

Figure 11A:
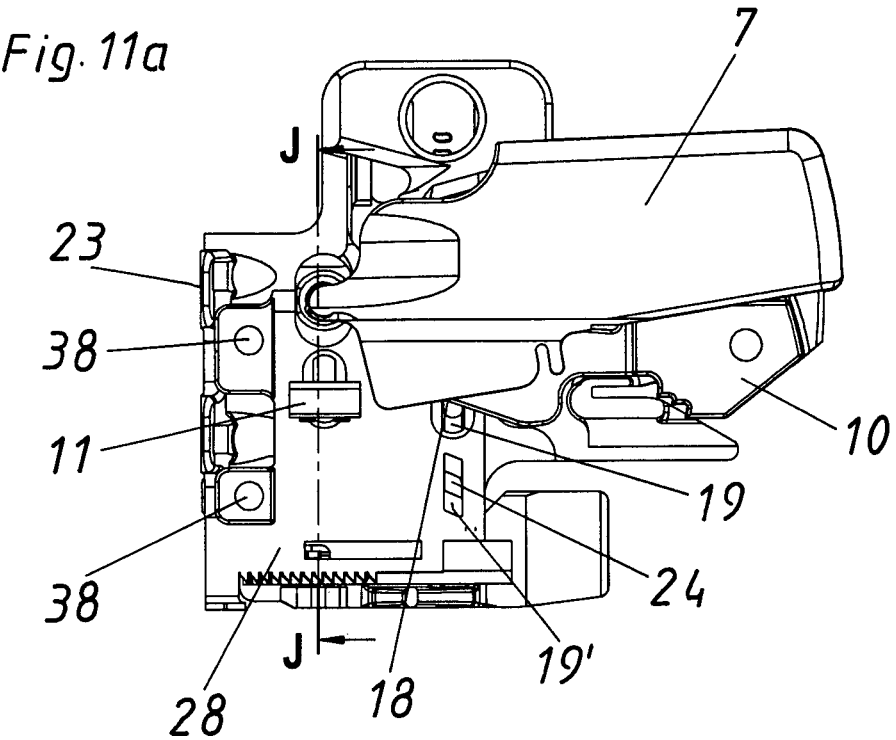
FIGS. 11a and 11b show a plan view of a second apparatus with arresting device in the open position and a sectional view along the section line identified by J-J in FIG. 11a, FIG. 12 shows a perspective view of a second embodiment of an apparatus according to the invention.

FIG. 11a shows a plan view of the second apparatus 6 in the non-arrested condition.

Figure 11B:
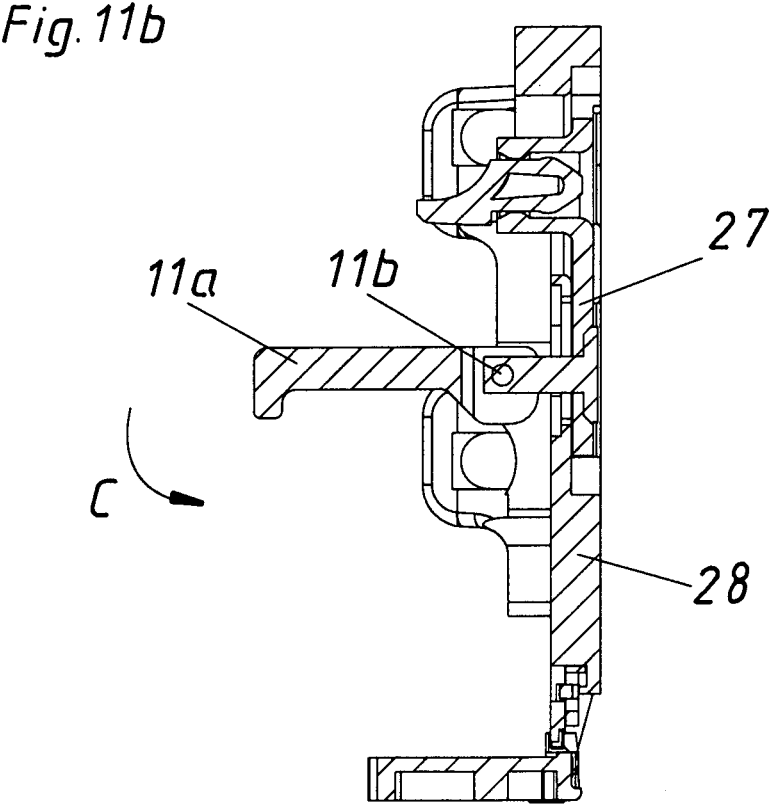

FIG. 11b shows a sectional view along the section line identified by J-J in FIG. 11a. In this case the lever action of the lever 11a can be particularly clearly seen. When it is pivoted in the direction indicated by the arrow C towards the mounting plate 28 of the second fixing portion 27, that gives the desired clamping action between the mounting plate 26 of the second coupling portion 25 and the mounting plate 28 of the second fixing portion 27.

Figure 12:
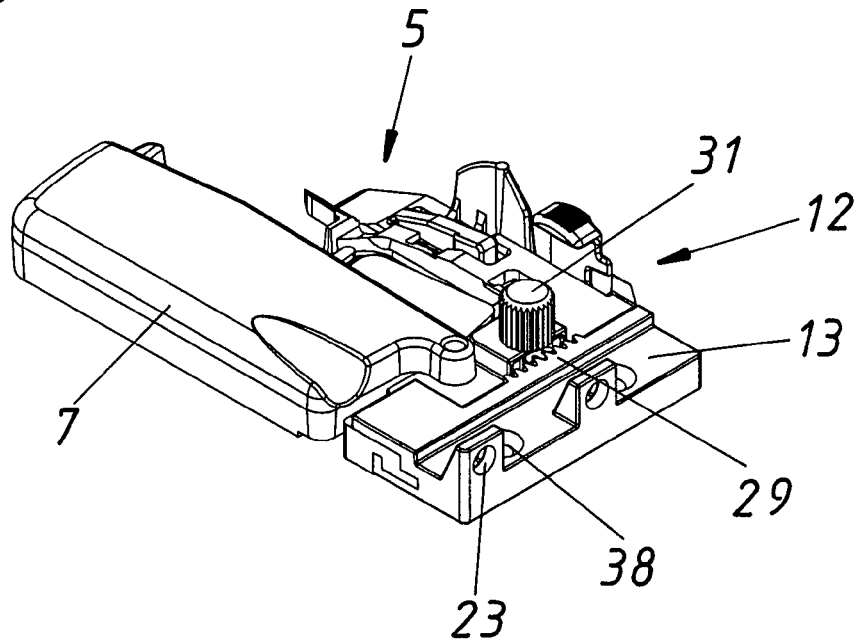

FIG. 12 shows an apparatus 5 for releasably coupling a drawer 2 to an extension guide 3 in a second embodiment. In this case the latching portion 10 and the release portion 7 of the apparatus can be constructed as in the first embodiment. In this embodiment the fixing portion 13 of the apparatus 5 has a tooth arrangement 29 which in the mounted condition of the apparatus 5 is oriented along the front panel 2a and thus in a lateral direction.

Figure 13:
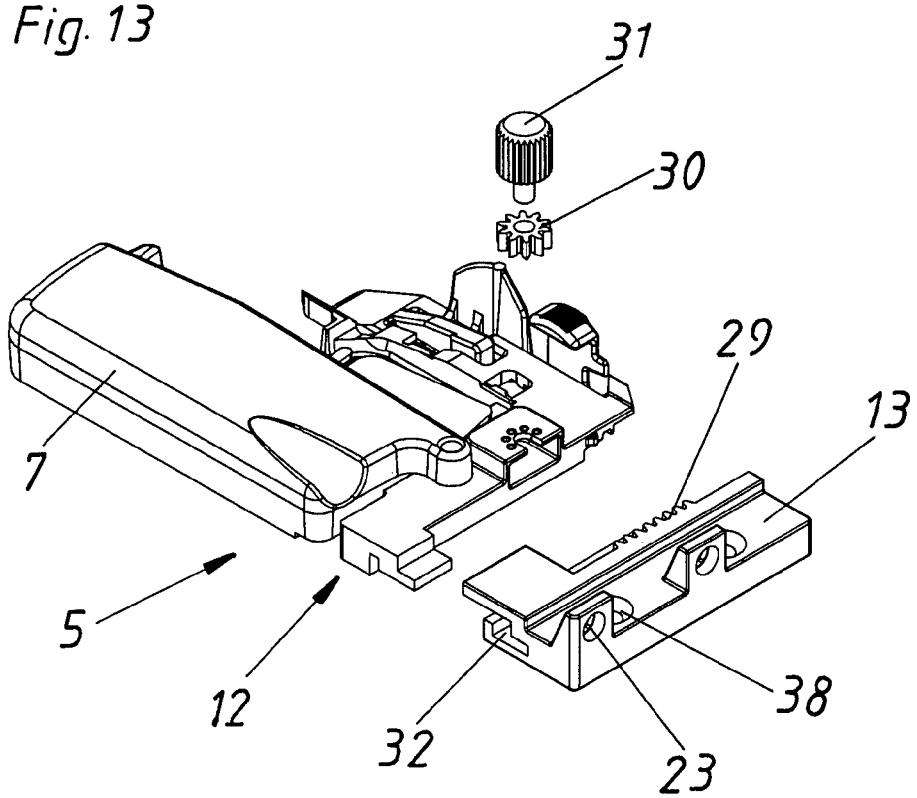
FIG. 13 shows a perspective view of the apparatus of FIG. 12 with a partial exploded view.

As can be seen from the partly exploded view in FIG. 13 a gear 30 and an adjusting wheel 31 are mounted rotatably to the coupling portion 12. Rotation of the adjusting wheel 31 is transmitted to the gear 30 and subsequently to the tooth arrangement 29 so that the coupling portion 12 and the fixing portion 13 are displaceable relative to each other if the gear 30 is in engagement with the tooth arrangement 29. Various abutment surfaces 32 of the fixing portion 13 are in engagement with corresponding surfaces on the coupling portion 12 and serve to guide the relative positional displacements of the coupling portion 12 and the actuating portion 13.

Figure 14A:
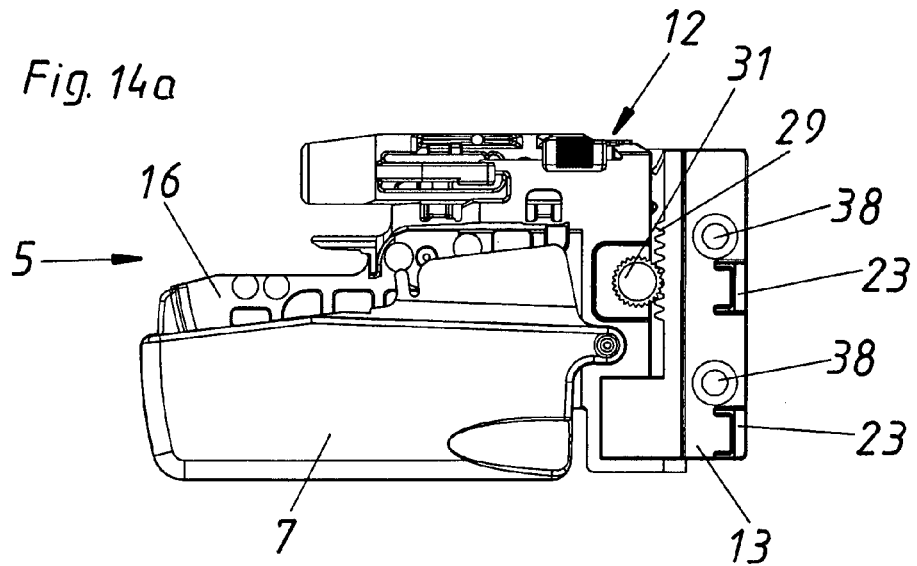
FIGS. 14a-14c show a plan view of the FIG. 12 apparatus in various adjustment positions.
Figure 14B:
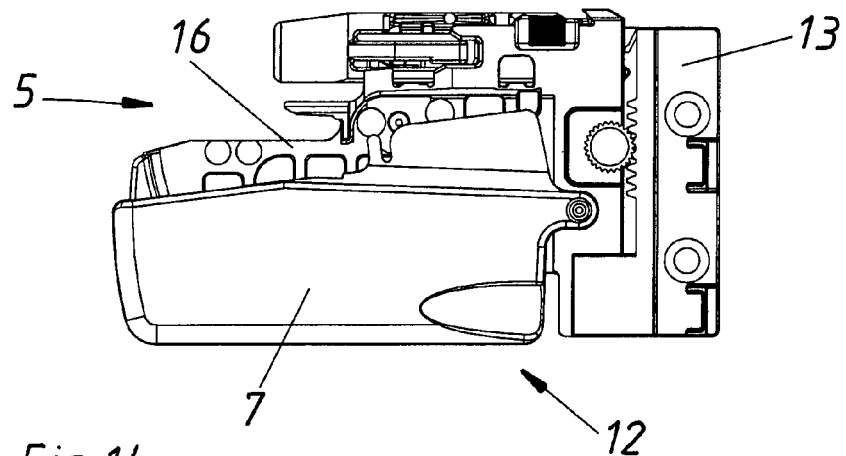
Figure 14C:
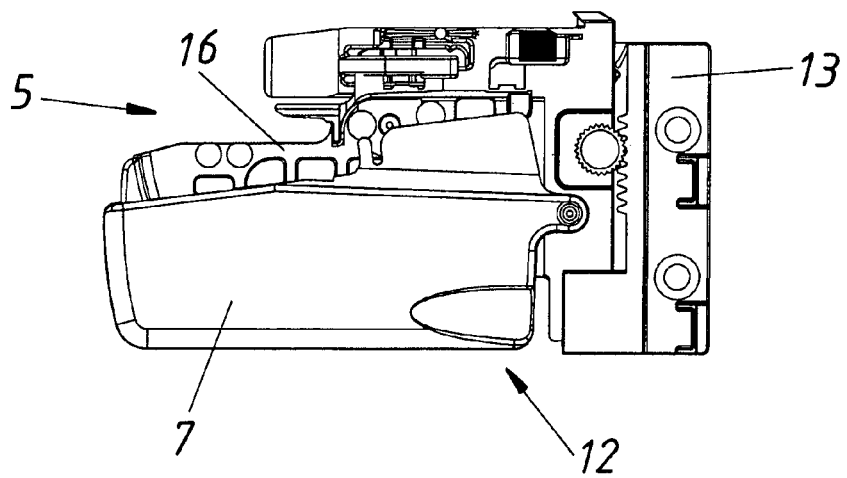

FIG. 14a through 14c each show a plan view of the apparatus 5 in FIG. 12. Rotation of the adjusting wheel 31 produces a relative positional displacement of the fixing portion 13 and the coupling portion 12 in the directions indicated by the double-headed arrow A. In this respect FIGS. 14a, 14b and 14c differ in terms of the relative position of the fixing portion 13 and the coupling portion 12.

The invention claimed is:

1. An apparatus for releasably coupling a drawer to an extendable rail of an extension guide, comprising:
    a fixing portion which is to be fixed to the drawer;
    a coupling portion having a resilient or spring-loaded latching portion which can be releasably coupled to the rail, and having a release portion for releasing the latching portion from the rail, the fixing portion and the coupling portion being mounted so as to be displaceable relative to each other; and
    an adjusting device including an adjusting wheel which is rotatably mounted to one of the fixing portion and the coupling portion and which is engaged with the other of the fixing portion and the coupling portion such that a rotation of the adjusting wheel adjusts a position of the fixing portion and a position of the coupling portion relative to each other so as to adjust a position of the drawer relative to the rail in a lateral direction, wherein the lateral direction is a horizontally transverse direction relative to a longitudinal direction of the rail in which the drawer is to be pulled out,
    wherein the adjusting device includes a gear, and the adjusting wheel is in engagement with a tooth arrangement on the other of the fixing portion and the coupling portion via the gear.

2. The apparatus as set forth in claim 1, further comprising a guide device by which the fixing portion and the coupling portion are guided displaceably relative to each other.

3. The apparatus as set forth in claim 2, wherein the guide device has at least one slot which is arranged in one of the fixing portion and the coupling portion and into which engages a guide pin or guide projection fitted on the other of the fixing portion and the coupling portion.

4. The apparatus as set forth in claim 1, wherein the adjusting device is of an at least two-part configuration, wherein a first part is arranged on the fixing portion and a second part is arranged on the coupling portion.

5. The apparatus as set forth in claim 1, further comprising an arresting device by which the positions of the fixing portion and the coupling portion relative to each other can be releasably arrested.

6. The apparatus as set forth in claim 5, wherein the arresting device includes an eccentric screw producing a clamping action.

7. The apparatus as set forth in claim 1, wherein the adjusting wheel has a spiral disk which is in engagement with holding elements mounted on the other of the fixing portion and the coupling portion at discrete spacings, wherein the spiral disk is guided along the holding elements by rotation of the adjusting wheel for relative positional displacement of the fixing portion and the coupling portion.

8. The apparatus as set forth in claim 1, wherein the adjusting device has an eccentric.

9. An apparatus set for releasably coupling a drawer to first and second extendable rails of a respective extension guide, the rails being arranged at mutually opposite sides of a furniture carcass, including:
   a first apparatus for releasably coupling the drawer to the first rail, wherein the first apparatus is the apparatus as set forth in claim 1, and
   a second apparatus for releasably coupling the drawer to the second rail, wherein
   the second apparatus has a second fixing portion which can be fixed to the drawer and a second coupling portion which can be coupled to the second rail, wherein the second fixing portion and the second coupling portion are mounted movably relative to each other for adaptation to the relative positional displacement of the fixing portion and the coupling portion of the first apparatus.

10. The apparatus set as set forth in claim 9, wherein arranged at the second apparatus is a second guide device by which the second fixing portion and the second coupling portion are guided displaceably relative to each other.

11. The apparatus set as set forth in claim 10, wherein the second guide device has at least one slot which is arranged in one of the second fixing portion and the second coupling portion and into which engages a guide pin or guide projection mounted to the other of the second fixing portion and the second coupling portion.

12. The apparatus set as set forth in claim 9, wherein the second apparatus has an arresting device by which the second fixing portion and the second coupling portion can be releasably arrested.

13. A drawer comprising:
   an extension guide having an extendable rail; and
   the apparatus as set forth in claim 1, wherein the fixing portion is fixed to the drawer.

14. An article of furniture comprising:
   a furniture carcass; and
   the drawer as set forth in claim 13 arranged in the furniture carcass.

15. An apparatus set for releasably coupling a drawer to first and second extendable rails of a respective extension guide, the rails being arranged at mutually opposite sides of a furniture carcass, including:
   a first apparatus for releasably coupling the drawer to the first rail, wherein the first apparatus is the apparatus as set forth in claim 4; and
   a second apparatus for releasably coupling the drawer to the second rail, wherein
   the second apparatus has a second fixing portion which can be fixed to the drawer and a second coupling portion which can be coupled to the second rail, wherein the second fixing portion and the second coupling portion are mounted movably relative to each other for adaptation to the relative positional displacement of the fixing portion and the coupling portion of the first apparatus.

16. An apparatus set for releasably coupling a drawer to first and second extendable rails of a respective extension guide, the rails being arranged at mutually opposite sides of a furniture carcass, including:
   a first apparatus for releasably coupling the drawer to the first rail, wherein the first apparatus is the apparatus as set forth in claim 7; and
   a second apparatus for releasably coupling the drawer to the second rail, wherein
   the second apparatus has a second fixing portion which can be fixed to the drawer and a second coupling portion which can be coupled to the second rail, wherein the second fixing portion and the second coupling portion are mounted movably relative to each other for adaptation to the relative positional displacement of the fixing portion and the coupling portion of the first apparatus.

* * * * *